US011361926B2

(12) United States Patent
Cheng

(10) Patent No.: US 11,361,926 B2
(45) Date of Patent: Jun. 14, 2022

(54) APPARATUS, SYSTEM AND METHOD FOR ALARM TRIGGERED ELECTRICAL SUPPLY DISCONNECTION

(71) Applicant: Hong Cheng, Hamilton (NZ)

(72) Inventor: Hong Cheng, Hamilton (NZ)

( * ) Notice: Subject to any disclaimer, the term of this patent is extended or adjusted under 35 U.S.C. 154(b) by 238 days.

(21) Appl. No.: 16/097,141

(22) PCT Filed: Apr. 27, 2017

(86) PCT No.: PCT/NZ2017/050048
§ 371 (c)(1),
(2) Date: Oct. 26, 2018

(87) PCT Pub. No.: WO2017/188826
PCT Pub. Date: Nov. 2, 2017

(65) Prior Publication Data
US 2019/0148097 A1 May 16, 2019

(30) Foreign Application Priority Data

Apr. 29, 2016 (NZ) .................................. 719573
Dec. 21, 2016 (NZ) .................................. 727775

(51) Int. Cl.
*H01H 83/02* (2006.01)
*H02H 3/04* (2006.01)
*H02H 3/16* (2006.01)

(52) U.S. Cl.
CPC .............. *H01H 83/02* (2013.01); *H02H 3/04* (2013.01); *H02H 3/044* (2013.01); *H02H 3/16* (2013.01); *H02H 3/167* (2013.01)

(58) Field of Classification Search
CPC .... G08B 17/00; G08B 17/107; G08B 17/113; G08B 19/00; G08B 19/005; G08B 21/14; H01H 11/00; H01H 13/50; H01H 83/02; H02H 3/04; H02H 3/044; H02H 3/16; H02H 3/167; H04N 5/77; Y10T 29/49117; Y10T 29/49826; Y10T 29/49947; Y10T 29/49959
See application file for complete search history.

(56) References Cited

U.S. PATENT DOCUMENTS

| 6,262,871 | B1 * | 7/2001 | Nemir | G01R 31/327 |
| | | | | 324/424 |
| 8,450,879 | B2 * | 5/2013 | Chilvers | H02H 3/334 |
| | | | | 307/116 |
| 10,892,614 | B2 * | 1/2021 | Lindsay | H02H 3/338 |
| 2009/0121887 | A1 * | 5/2009 | Fong | H02H 3/335 |
| | | | | 340/650 |

(Continued)

FOREIGN PATENT DOCUMENTS

| GB | 2477737 A * | 8/2011 | ............ G08B 17/10 |
| WO | WO-2007123389 A1 * | 11/2007 | ............ H02H 3/335 |

*Primary Examiner* — Jared Fureman
*Assistant Examiner* — Nicolas Bellido
(74) *Attorney, Agent, or Firm* — FisherBroyles, LLP

(57) ABSTRACT

A system is described herein, including an activation circuit configured to generate a signal indicative of an alarm condition. A residual current device trigger circuit is coupled to the activation circuit and a residual current device. The residual current device trigger circuit is configured to provide a simulated earth leakage current condition to trigger the residual current device on receiving the signal indicative of the alarm condition.

19 Claims, 6 Drawing Sheets

(56) References Cited

U.S. PATENT DOCUMENTS

| | | | | |
|---|---|---|---|---|
| 2010/0052691 A1* | 3/2010 | Fong | ............... | H02H 3/335 |
| | | | | 324/424 |
| 2012/0257330 A1* | 10/2012 | Garrard | ............ | H01H 71/1027 |
| | | | | 361/632 |
| 2015/0096876 A1* | 4/2015 | Mittleman | ............ | H04N 5/77 |
| | | | | 200/341 |
| 2015/0309105 A1* | 10/2015 | Ostrovsky | ............ | G01R 35/00 |
| | | | | 324/509 |

* cited by examiner

APPARATUS, SYSTEM AND METHOD FOR ALARM TRIGGERED ELECTRICAL SUPPLY DISCONNECTION

PRIORITY APPLICATIONS

This application is a U. S. National Stage Filing under 35 U.S.C. 371 from International Application No. PCT/NZ2017/050048, filed on 27 Apr. 2017 and published as WO 2017/188826 on 2 Nov. 2017, which claims the benefit of priority to New Zealand Patent Application No. 719573 filed 8 Apr. 2016, and New Zealand Patent Application No. 727775 filed 21 Dec. 2016, which applications and publication are incorporated herein by referenced in their entirety.

TECHNICAL FIELD

The present disclosure relates to an apparatus, system and method for alarm triggered electrical supply disconnection, more particularly disconnection of a mains electrical supply by triggering of a residual current device.

BACKGROUND

Many fires are caused by electrical devices, either due to failure or inappropriate positioning or use. For example items in contact with, or in close proximity to, an electric heater or iron may overheat and ignite. Similarly, unattended kitchen appliances such as ovens or stoves are a significant cause of fires in homes.

Smoke or fire detectors are well known for the issuing of an alarm or activation of fire suppression systems (such as sprinkler systems) in the event of a fire or at least early indicators thereof such as smoke. However, in numerous cases the continued operation of the electrical devices contributes to the actual occurrence of a fire—even after the detector activates. Even in cases where a person becomes aware of the alarm, they may not have the presence of mind (or understanding of the underlying problem) to disconnect power to the device.

Eventually damage to the device may result in a short circuit condition which triggers a circuit protection device in the mains power supply, such as a fuse, but by that stage the fire may be self-sustaining and continue to grow after power is cut to the device.

There are also other circumstances in which it may be desirous to disconnect a device, or devices on a sub-circuit, from mains power supply—for example security, to reduce power consumption, or reduce potential of a fire resulting from a fault in the device while a space is unoccupied.

It is an object of the present invention to address the foregoing problems or at least to provide the public with a useful choice.

Further aspects and advantages of the present invention will become apparent from the ensuing description which is given by way of example only.

SUMMARY OF THE DISCLOSURE

According to an exemplary embodiment of the present disclosure there is provided a device, including:
an activation circuit configured to generate a signal indicative of an alarm condition;
an RCD trigger circuit coupled to the activation circuit and a residual current device (RCD), configured to provide a simulated earth leakage current condition to trigger the RCD on receiving the signal indicative of the alarm condition.

According to an exemplary embodiment of the present disclosure there is provided an apparatus, including:
an RCD trigger circuit configured to be coupled to an activation circuit configured to generate a signal indicative of an alarm condition, and a residual current device (RCD),
where in the RCD trigger circuit is configured to provide a simulated earth leakage current condition to trigger the RCD on receiving the signal indicative of the alarm condition.

According to an exemplary embodiment of the present disclosure there is provided a system, including:
a residual current device (RCD);
an activation circuit configured to generate a signal indicative of an alarm condition; and
an RCD trigger circuit coupled to the activation circuit and the RCD, configured to provide a simulated earth leakage current condition to trigger the RCD on receiving the signal indicative of the alarm condition.

Earth leakage current refers to the unwanted flow of current between current carrying conductors (commonly referred to as live and neutral, and will be referred to herein as such) in an electrical circuit, and earth. One or more residual current devices (RCDs) may be connected between mains supply and sub-circuits of a building, configured to disconnect the circuit in the event of a current imbalance between the conductors—i.e. on detecting earth leakage current. By using the RCD trigger circuit to simulate an earth leakage condition in the event of an alarm condition, the RCD may be selectively tripped to de-power the one or more sub-circuits associated with the RCD.

In an exemplary embodiment it is envisaged that the RCD may be a Residual Current Circuit Breaker (RCCB). It is envisaged that in many installations, overload protection may be provided within the building circuit separately to the RCD. As such an RCCB may be preferred over RCD types which include overload protection, for example a Residual Current Circuit Breaker with Overcurrent Protection (RCBO).

In an exemplary embodiment the RCD trigger circuit may include a switching device configured to provide a connection for the simulated earth leakage current between live and earth. In an exemplary embodiment it is envisaged that the switching device may be a solid state relay. Solid state relays consume very little current, and as such may be triggered by the activation circuit without interfering with its operation. More particularly, a low current draw reduces the likelihood of interference with operation of alarm devices such as piezoelectric buzzers. However it should be appreciated that other switching devices (for example, an electromechanical relay) may be used in exemplary embodiments, particularly where the signal generated by the activation circuit can be passed to a heavier load without compromising operation of the activation circuit.

The activation circuit may be that of any suitable device having a function for which it is desirable to disconnect a sub-circuit from mains supply. For example, the activation circuit may be that of a security device—for example a motion detector, photoelectric beam, glassbreak detector—or a user activated disconnection circuit. In an exemplary embodiment the user activated disconnection circuit may include a manually actuated switching device, such as a push button or toggle switch, activation of which causes generation of the signal indicative of an alarm condition. In an exemplary embodiment the user activated disconnection circuit may include a communication device configured to receive a signal sent remotely from the user, receipt of which causes generation of the signal indicative of an alarm condition.

In an exemplary embodiment more than one activation circuit may be provided. For example, a user activated disconnection circuit may be provided in addition to an activation circuit having a sensor configured to generate the signal indicative of an alarm condition.

In an exemplary embodiment, the apparatus may be provided between a power source and a power supply for a computing device (for example, a personal computer or a server). It is envisaged that in such embodiments the apparatus may include an RCD. In exemplary embodiments the apparatus may be provided as a discrete component to the computing device—for example, having removeable connectors between the apparatus and the power supply, and the apparatus and the power source—however it is also envisaged that the apparatus may be integrated into either the power supply or the interface of the power supply. The computing device may be configured to operate an automated intrusion detection software tool, and act as the activation circuit by outputting a signal on detection of an intrusion event to provide intrusion prevention functionality. It should be appreciated that various techniques may be used to deliver the activation signal from the computing device. For example a port of the computing device, such as a USB port, may be connected to the apparatus, and the signal delivered via the port. In an exemplary embodiment the apparatus may include a wireless signal receiver, and receive the signal indicative of detection of an intrusion event transmitted wirelessly from the computing device. On receiving the signal, the RCD trigger circuit provides a simulated earth leakage current condition to trigger the RCD and disconnect the power supply to frustrate the intrusion event.

However, it is envisaged that exemplary embodiments of the present disclosure may have particularly application to fire detection. As such, the activation circuit may be described herein as a fire detector circuit for ease of understanding. The fire detector circuit may be any suitable circuit configured to be responsive to indicators of one or more of combustion, heat, smoke, flame, or gas. For example, such detector circuits may be responsive to temperature, smoke, or gas composition (for example, carbon monoxide).

In an exemplary embodiment the fire detector circuit may include an alarm device, with activation of the alarm device providing the signal indicative of the alarm condition. For example, piezoelectric buzzers are known in the art of smoke detectors for providing an audible alarm. The DC signal delivered to the buzzer may be used to trigger the simulated earth leakage current switching device (for example, a solid state relay). It should be appreciated that in exemplary embodiments the trigger circuit may be provided from a dedicated output.

In an exemplary embodiment the RCD trigger circuit may be configured to provide a simulated earth leakage current in the order of about 15 mA to about 150 mA. In an exemplary embodiment the simulated earth leakage current may be in the order of about 30 mA to about 100 mA. It should be appreciated that the RCD trigger circuit may be configured to provide any simulated earth leakage current sufficient to trip the RCD to which it is connected—however, it is envisaged that the range of about 30 mA to about 100 mA may allow for greater flexibility in selecting a delay timer coil resistance value, or reducing the voltage drop in power supply to the timer in exemplary embodiments of a fault protection circuit (as will be described further below) in order to maintain the voltage at a sufficient level for timer operation. It should be appreciated that this current value may be achieved by any suitable method known in the art, for example by selection of an appropriate resistance between live and earth through the switching device.

In an exemplary embodiment the circuit may include a voltage limiting circuit configured to limit the voltage on one or more sub-circuits connected to the RCD to a predetermined level determined to be safe for human contact on triggering of the RCD trigger circuit. It should be appreciated that while the actual values may be define by applicable standards, it is envisaged that the voltage limiting circuit may be configured to limit the voltage to less than about 50 Vac, for example less than about 25 Vac.

In an exemplary embodiment the voltage limiting circuit may include a second resistance between neutral and earth, forming a voltage divider network with the resistance of the RCD trigger circuit to provide the desired safe voltage while the RCD trigger circuit is activated. In an exemplary embodiment the voltage limiting circuit may include a switching device triggered by the fire detector circuit to selectively switch the second resistance into the voltage divider, for example a solid state relay connected across the buzzer of the fire detector circuit. In normal conditions in which the sub-circuit is connected to earth, the simulated earth leakage current will go to earth rather than neutral as the result of the second resistance—i.e. there is a low risk of a person receiving a shock. In circumstances in which there is a fault in the connection to earth, the earth leakage current will return to neutral through the second resistance to produce the safe voltage. In an exemplary embodiment the second resistance may be selected such that the safe voltage is about, or less than, a value of the tolerable variance in the voltage supply to a timer of a fault protection circuit as described below.

In an exemplary embodiment the circuit may include a fault protection circuit. In an exemplary embodiment the fault protection circuit may include a timer configured to disconnect the RCD trigger circuit in the event of the RCD not tripping. In exemplary embodiments the timer may be configured to disconnect the RCD trigger circuit in the event of an earth conductor fault—i.e. a connection to earth cannot be made. While it is envisaged that exemplary embodiments including the voltage limiting circuit may reduce the likelihood of a person receiving a harmful shock during the simulated earth leakage condition, disconnecting the RCD trigger circuit after the predetermined time may further reduce this likelihood. In an exemplary embodiment the fault protection circuit may include one or more switching devices controlled by the timer configured to switch off one or more of: the RCD trigger circuit, and the voltage limiting circuit.

In an exemplary embodiment the timer may be configured to disconnect the RCD trigger circuit after a maximal break time of the RCD has occurred. It should be appreciated that this maximal break time may be dependent on local regulations or standards—for example regulation 24(3)(a)(i) of the Electricity (Safety) Regulations 2010 deems an RCD to be unsafe if it does not interrupt the current in all live conductors within 300 milliseconds when passing its rated residual current. In an exemplary embodiment, an additional buffer time may be provided to give the opportunity for the RCD to trip for the purposes of fire risk reduction—for example for a total of about 400 milliseconds to about 1000 milliseconds. In the context of fire detection circuits, in which the alarm device is typically pulsed for durations of about 1 to 2 seconds, this delay may allow sufficient time to give the RCD an opportunity to trip while also acting within the duration of the alarm signal.

In an exemplary embodiment the fault protection circuit may include a fault indicator device, for example a light, triggered in the event of the RCD not tripping or an earth conductor fault. It is envisaged that the fault protection circuit may include a user input device, for example a user activated switch or push button, to reset the fault indicator device.

In an exemplary embodiment the apparatus may include a single phase three-electrode plug configured to connect the apparatus to a sub-circuit of the building and therefore the RCD. It should be appreciated that this is not intended to be limiting, and the apparatus may be hard-wired into a sub-circuit of the building.

In an exemplary embodiment the apparatus may include a power supply circuit for the fire detector circuit. As the apparatus requires connection to the sub-circuit of a building in order to operate, the power supply circuit leverages this connection to provide a more reliable power source than is often available to fire detectors. Many fire detectors rely on batteries to operate, and are therefore vulnerable to not operating correctly if those batteries are not monitored and replaced. In an exemplary embodiment the power supply circuit may include a power storage device—for example, a rechargeable battery—for powering the fire detector circuit after the RCD is tripped, or in other power outage conditions.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
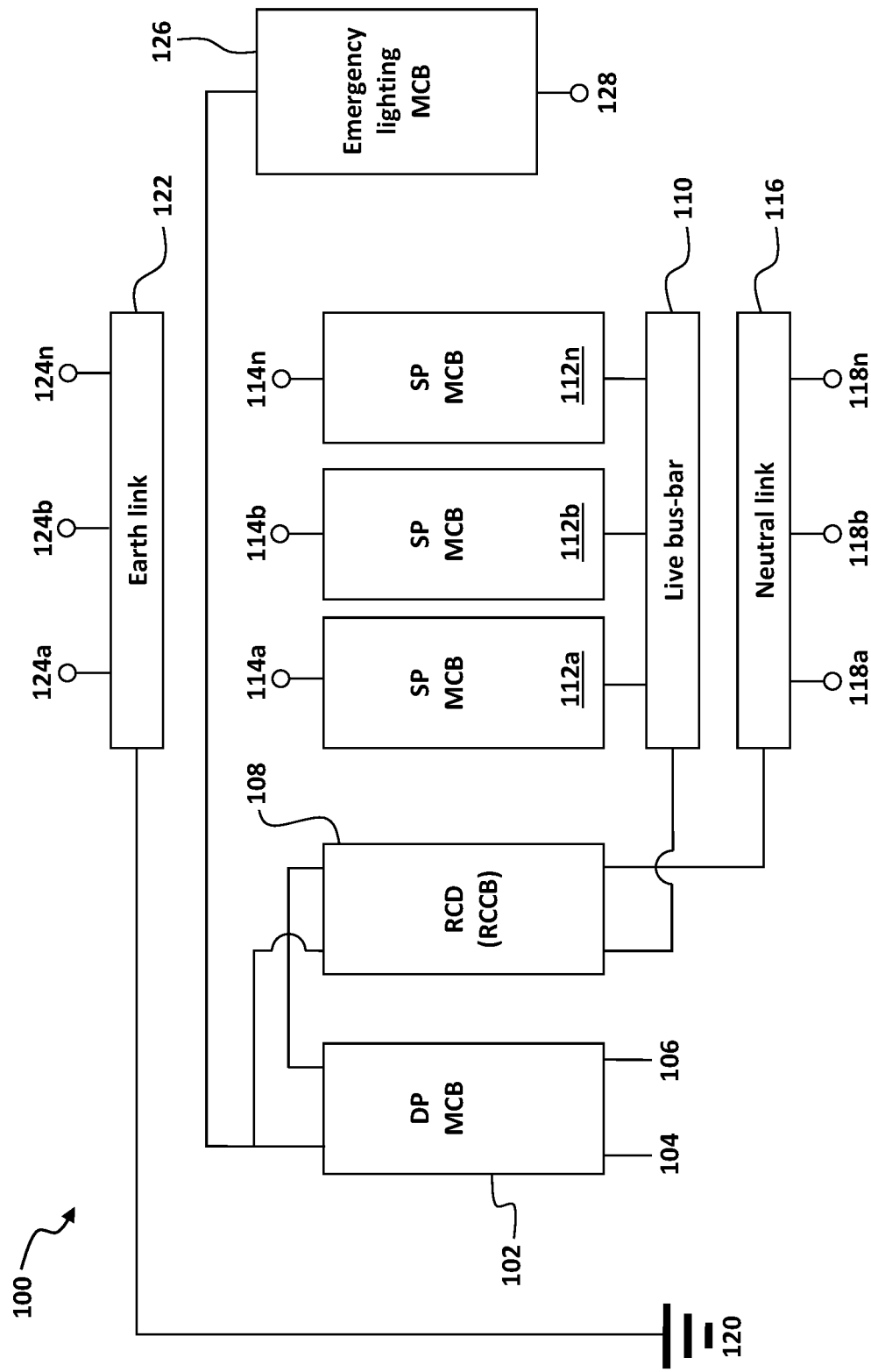
FIG. 1 illustrates a power distribution board for use in exemplary embodiments of the present disclosure.

FIG. 1 illustrates a typical distribution board arrangement 100, having a double pole miniature circuit breaker (DP-MCB) 102 connected to a live line 104 and a neutral line 106 received from an electrical utility service. In the exemplary embodiment illustrated the DP-MCB 102 is connected to a residual current device (RCD) in the form of a residual current circuit breaker (RCCB) 108, which is in turn connected from one output to a live bus-bar 110 splitting to a plurality of single poles miniature circuit breakers (SP-MCBs) 112a-n, with the outputs of the SP-MCBs 112a-n providing live conductors 114a-n within sub-circuits of the building associated with the distribution board 100. The other output of the RCCB 108 is connected to a neutral link 116, with outputs providing neutral conductors 118a-n within the sub-circuits. An earth 120 is connected to an earth link 122, with outputs providing earth conductors 124a-n within the sub-circuits. It should be appreciated that the arrangement described is for illustrative purposes, and is not intended to be limiting to all embodiments. For example, the RCCB 108 may be installed on one or more of the sub-circuits—for example on a power outlet sub-circuit but not an associated emergency lighting sub-circuit 126 having a dedicated emergency lighting MCB 128. It should also be appreciated that the operating principles described herein may be equally applicable to other mains wiring arrangements, for example a multiple-earthed neutral (MEN) configuration common in New Zealand. Additionally, it should be appreciated that in exemplary embodiments an isolator or mains switch may be used in place of the circuit breakers shown in FIG. 1. Further, reference may be made herein to the main supply voltage being 240 Vac—but it should be appreciated that the principles described herein may also be applied to other mains supply voltages such as 120 Vac.

Figure 2:
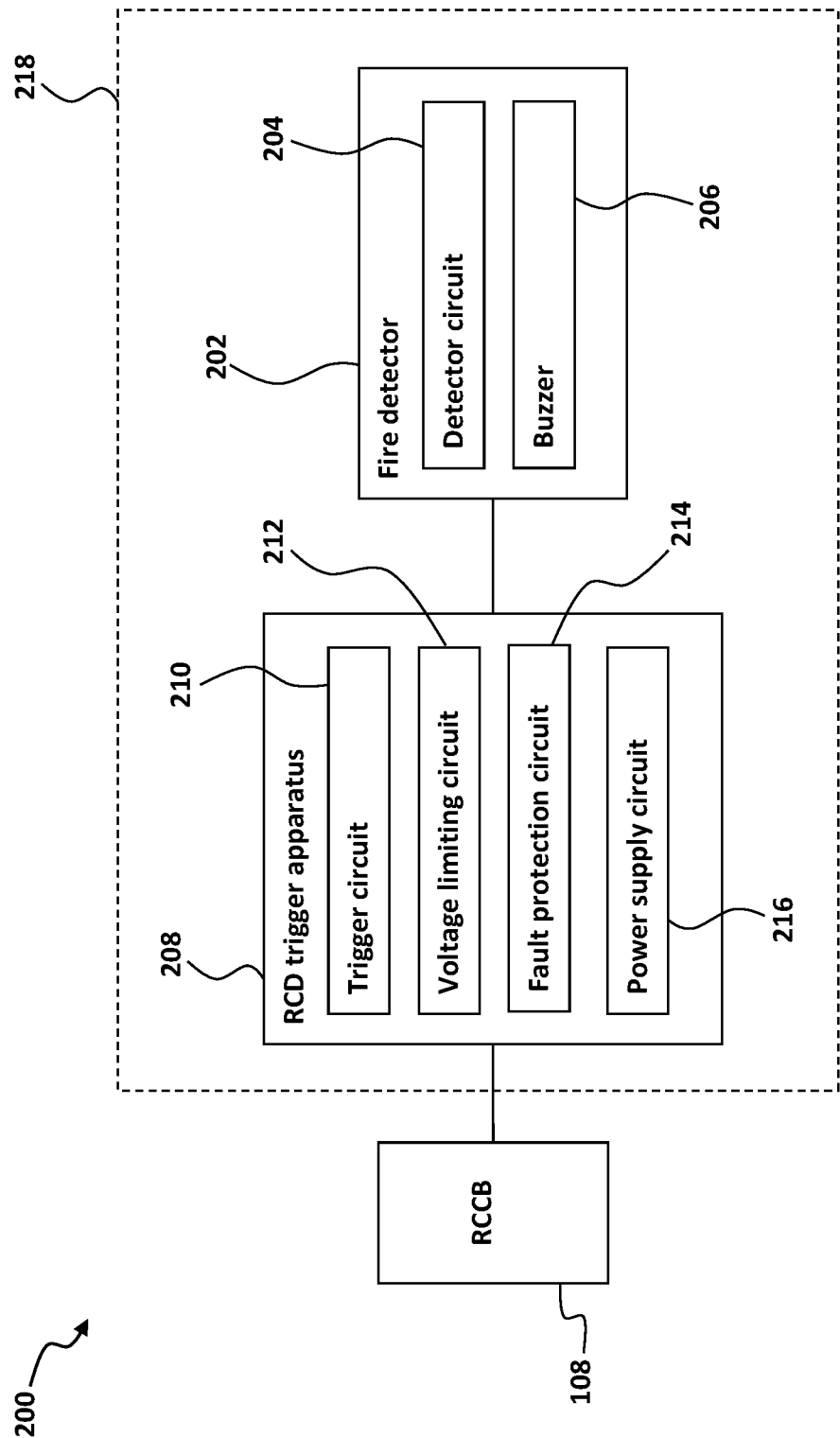
FIG. 2 is a schematic diagram of an exemplary system for tripping a residual current device of the distribution board.

FIG. 2 shows a system 200 for tripping the RCCB 108 in the event of a fire alarm condition. The system 200 includes a fire detector device 202 having a fire detector circuit 204 configured to generate a signal indicative of an alarm condition responsive to indicators of one or more of combustion, heat, smoke, flame, or gas. The signal activates an audible alarm in the form of a piezoelectric buzzer 206 of the fire detector device 202. It should be appreciated that while the system 200 is described in relation to fire detection, other signal generation devices may be used in place of the buzzer 206—for example a security sensor, or a receiver unit configured to receive a user control (whether manually activated, or via a remote device such as a computing device transmitting over a network).

The system 200 includes a RCD trigger apparatus 208 coupled to the fire detector device 202 and the RCCB 108. The RCD trigger apparatus 208 includes an RCD trigger circuit 210 configured to provide a simulated earth leakage current condition to trigger the RCCB 108 on receiving the signal indicative of the alarm condition. The RCD trigger apparatus 208 also includes a voltage limiting circuit 212 configured to limit the voltage on the sub-circuit to a pre-determined level determined to be safe for human contact on triggering of the RCD trigger circuit 210. A fault protection circuit 214 of the RCD trigger apparatus 208 includes a timer configured to disconnect the RCD trigger circuit 210 in the event of the RCCB 108 not tripping. In exemplary embodiments, the RCD trigger apparatus 208 may also include a power supply circuit 216 for the provision of power to the fire detector device 202—although it should be appreciated that this may not be required in which the fire detector source 202 has its own dedicated power source.

In exemplary embodiments, the RCD trigger apparatus 208 may be installed separately to the fire detector device 202—more particularly where the RCD trigger apparatus 208 is configured to interface with an existing fire detection device 202. However, it is also envisaged that in exemplary embodiments the RCD trigger apparatus 208 and fire detector device 202 may be packaged as an integrated unit 218.

Figure 3:
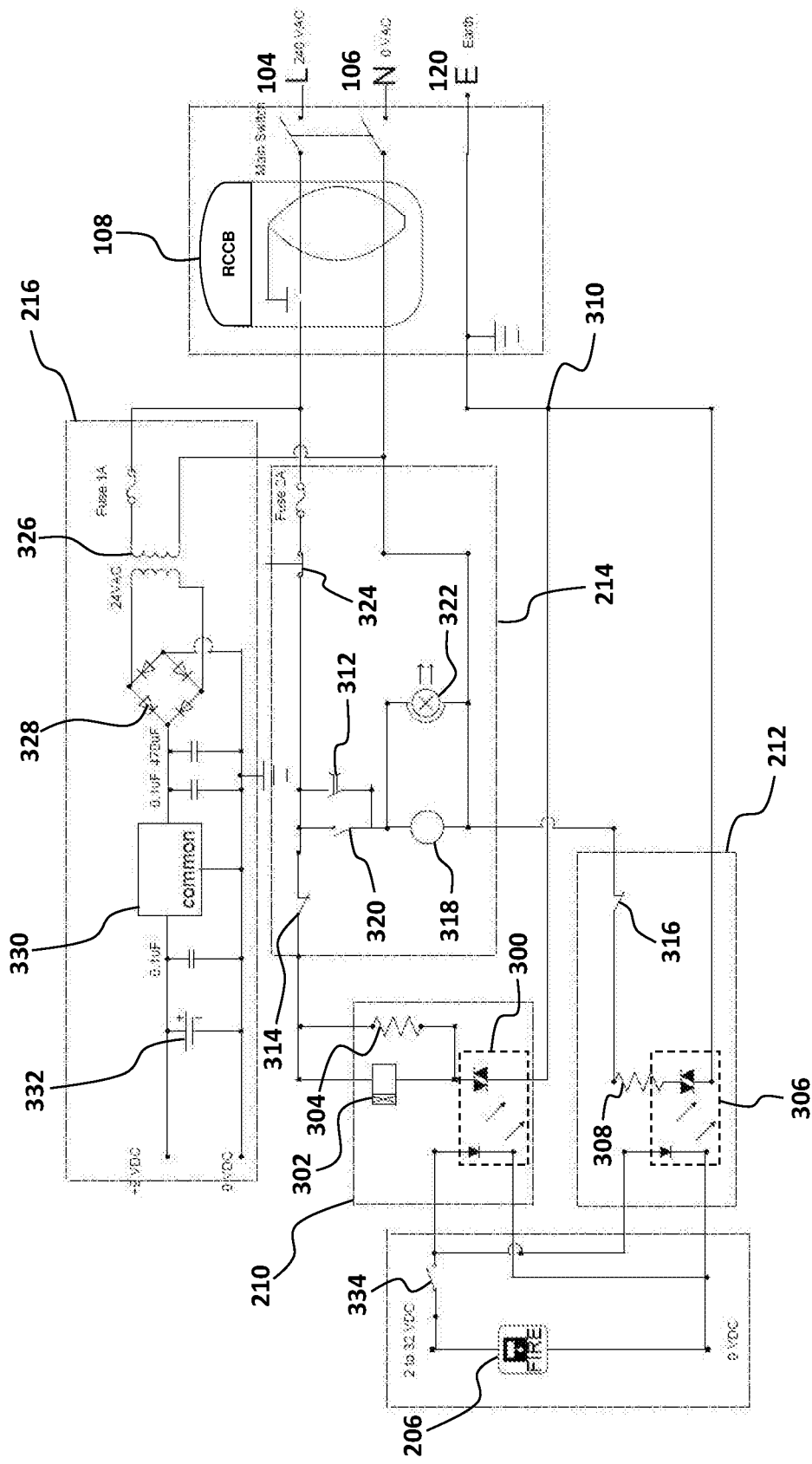
FIG. 3 is a circuit diagram of the exemplary system.

Referring to FIG. 3, the RCD trigger circuit 210 includes a switching device in the form of first solid state relay 300 having its DC input connected across the buzzer 206. In the case of piezoelectric buzzers having a feedback electrode, the first solid state relay 300 should be connected between the input electrode and negative pole, likely to be 0 Vdc, of the power supply of the fire detector device 202. The first solid state relay 300 may be, for example, a FSS1-102Z (5 Vdc) or KUDOM KSA 240D2-5. On activation of the buzzer 206, the first solid state relay 300 is activated to provide a connection for the simulated earth leakage current between live and earth. The RCD trigger circuit 210 includes a first resistance 302 selected to achieve a desired simulated earth leakage current. While the simulated earth leakage current may be any sufficient value to trigger the RCCB 108, for the purposes of description of this embodiment the desired simulated earth leakage current is in the order of about 30 mA to about 100 mA.

In the exemplary embodiment illustrated, the first resistance 302 is the coil of an ON-delay type time delay relay. In the exemplary embodiment illustrated, a resistive element 304 is provided in parallel with the first resistance 302. The resistive element 304 may be any suitable device for providing a sufficient current draw in conjunction with the first resistance 302 to achieve the desired simulated earth leakage current. For example, the resistive element 304 may be a resistor, or a light. It is envisaged that this may allow for use of presently available timers which do not draw sufficient current to achieve a desired simulated earth leakage current. However it should be appreciated that this is not intended to be limiting to all embodiments, and that it is envisaged that the first resistance 302 may be used without the parallel resistive element 304.

For example, TA8-A series timer supplied by IMO Precision Controls has been found by the inventor to draw 8 mA at 232.7 Vac. When a 6800 Ohm high power resistor (for example a SBCHE6 6K8 High Power Resistor) is used as the parallel resistive element 304, the inventor has measured the total current as 41.2 mA. It should be appreciated that the resistor values may be selected based on the mains supply voltage—for example 120 Vac or 240 Vac. In an exemplary embodiment in which the mains supply voltage is 120 Vac, the parallel resistive element 304 may be a 3300 Ohm high power resistor (for example a SBC-4 3k3 High Power Resistor).

The voltage limiting circuit 212 includes a switching device in the form of second solid state relay 306 having its DC input connected in parallel with the first solid state relay 300 input. The voltage limiting circuit 212 also includes a second resistance 308 between neutral and earth, forming a voltage divider network with the first resistance 302 of the RCD trigger circuit 210 to provide a desired safe voltage while the RCD trigger circuit 210 is activated. In normal conditions in which the sub-circuit is connected to earth 118 through connection point 310, the simulated earth leakage current will go to earth 120 rather than neutral 106 as the result of the second resistance 308. In circumstances in which there is a fault in the connection to earth (for example a break between earth 120 and the connection point 310), the simulated earth leakage current will return to neutral 106 through the second resistance 308 to produce the safe voltage.

The first resistance 302, parallel resistive element 304, and second resistance 308 may be selected to achieve the desired "safety" voltage, and simulated earth leakage current. In addition to achieving a safe voltage level, the resistance values may also be selected in order to limit the associated voltage drop on the power supply to the time delay relay (discussed below) to less than about 10% of the supply voltage. Many commercially available timers have a tolerance of approximately 15% variability in order to preserve normal function. For example, it is envisaged that where the simulated earth leakage current is between about 33 mA to about 100 mA, the second resistance 308 may be in the order of about 50 to about 80 ohms, with an associated "safety" voltage of about 1.6 Vac to about 8 Vac. It is envisaged that this configuration may therefore be viable with both 120 Vac and 240 Vac power supplies.

The fault protection circuit 214 uses the time delay relay (illustrated in FIG. 3 as the time delay coil 302 and a time delayed switch 312) to disconnect the RCD trigger circuit 210 and the voltage limiting circuit 212 in the event of the RCCB 108 not tripping within a pre-determined time period. A control relay is represented in FIG. 3 as discrete components: including a first normally closed switch 314 between live line 104 and the time delay coil 302, a second normally closed switch 316 between the second resistance 308 and neutral line 106, a relay coil 318 between the neutral line 106 and the time delayed switch 312, and a normally open switch 320 between the live line 104 and the relay coil 318.

In the event that the RCCB 108 is not triggered within 400 milliseconds (i.e. the time delay coil 302 remains energized), the time delayed switch 312 is closed to energise the relay coil 318. Energising of the relay coil 318 opens the first normally closed switch 314 to disconnect the first solid state relay 300 (and therefore the simulated earth leakage current), and also opens the second normally closed switch 316 to disconnect the second solid state relay 306 (and therefore the voltage limiting circuit 212). Relay coil 318 remains latched by the normally open switch 320.

In addition to disconnecting the RCD trigger circuit 210 and the voltage limiting circuit 212, in an exemplary embodiment the fault protection circuit 214 includes a fault indicator device in the form of a light 322, connected between the normally open switch 320 and neutral and switched on in the event of the RCCB 108 not tripping or an earth conductor fault. This simultaneously disconnects the second solid state relay 306 to turn off the voltage limiting circuit 212. The fault protection circuit 214 includes a user input device in the form of a push button 324, to reset the light 322.

The power supply circuit 216 includes a step-down transformer 326 dropping the 240 Vac mains voltage to 24 Vac, after which bridge rectifier 328 converts the AC input to DC. A voltage regulator 330 regulates the rectified output for supply to a rechargeable battery 332, for example 9 Vdc. The rechargeable battery 332 supplies the fire detector device 202.

A user selectable switch 334 is provided for operatively disconnecting the RCD trigger apparatus 208 from the fire detector device 202—more particularly the RCD trigger circuit 210, voltage limiting circuit 212, and fault protection circuit 214. It should be appreciated that an operation indication device, such as a light, may be provided to indicate whether the RCD trigger apparatus 208 is operational or deactivated.

Figure 4:
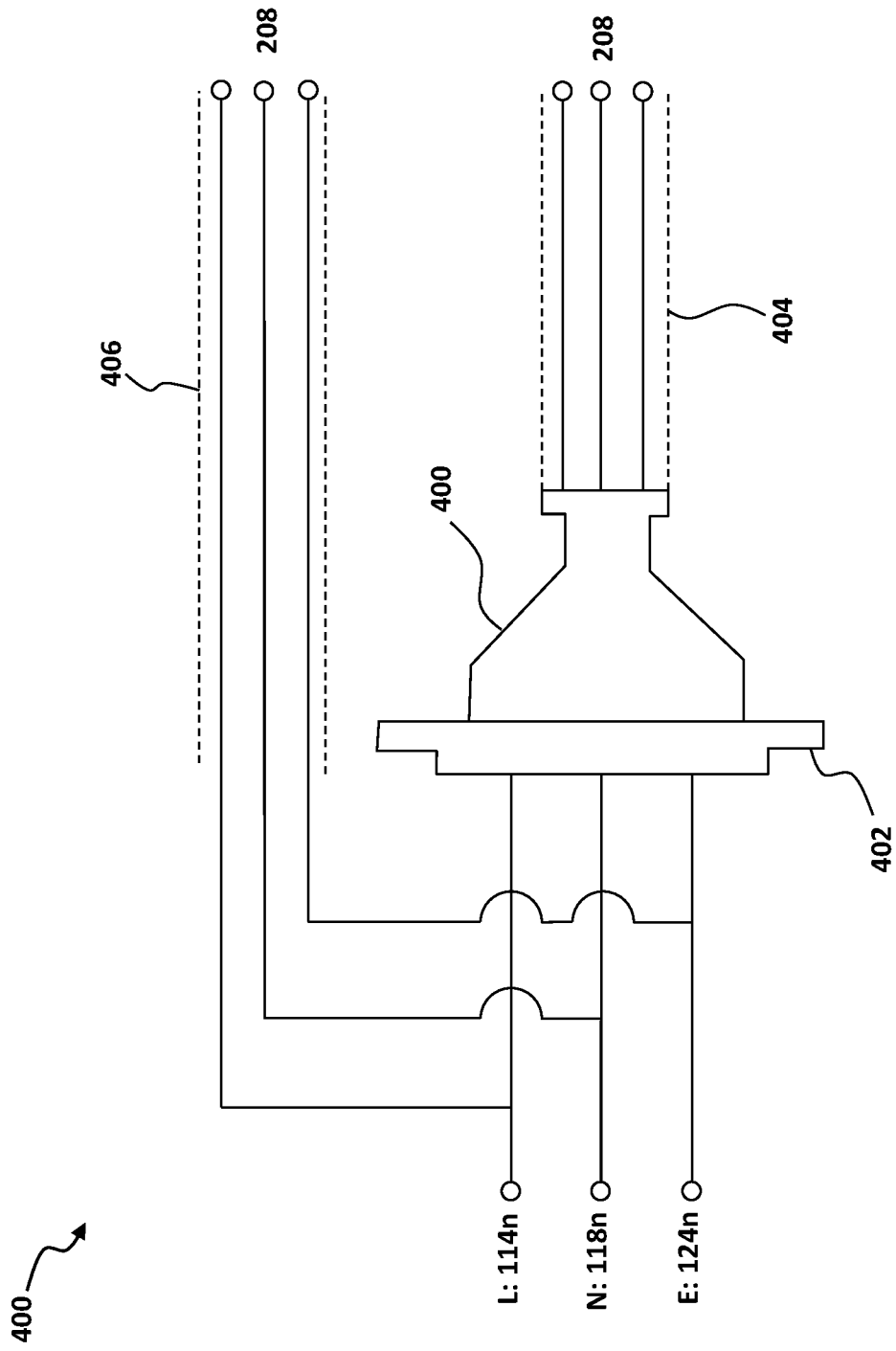
FIG. 4 illustrates means for connection of the system to a sub-circuit connected to the distribution board.

FIG. 4 illustrates exemplary connections between the RCD trigger apparatus 208 and the sub-circuit connections of live conductor 114n, neutral conductor 118n, and earth conductor 124n. In one embodiment, a single phase three pole plug 400 may be inserted into an existing socket 402, with a cable 404 from the plug 400 connecting to the RCD trigger apparatus 208. In another embodiment, a cable 406 may be hardwired to the live conductor 114n, neutral conductor 118n, and earth conductor 124n.

Figure 5A:
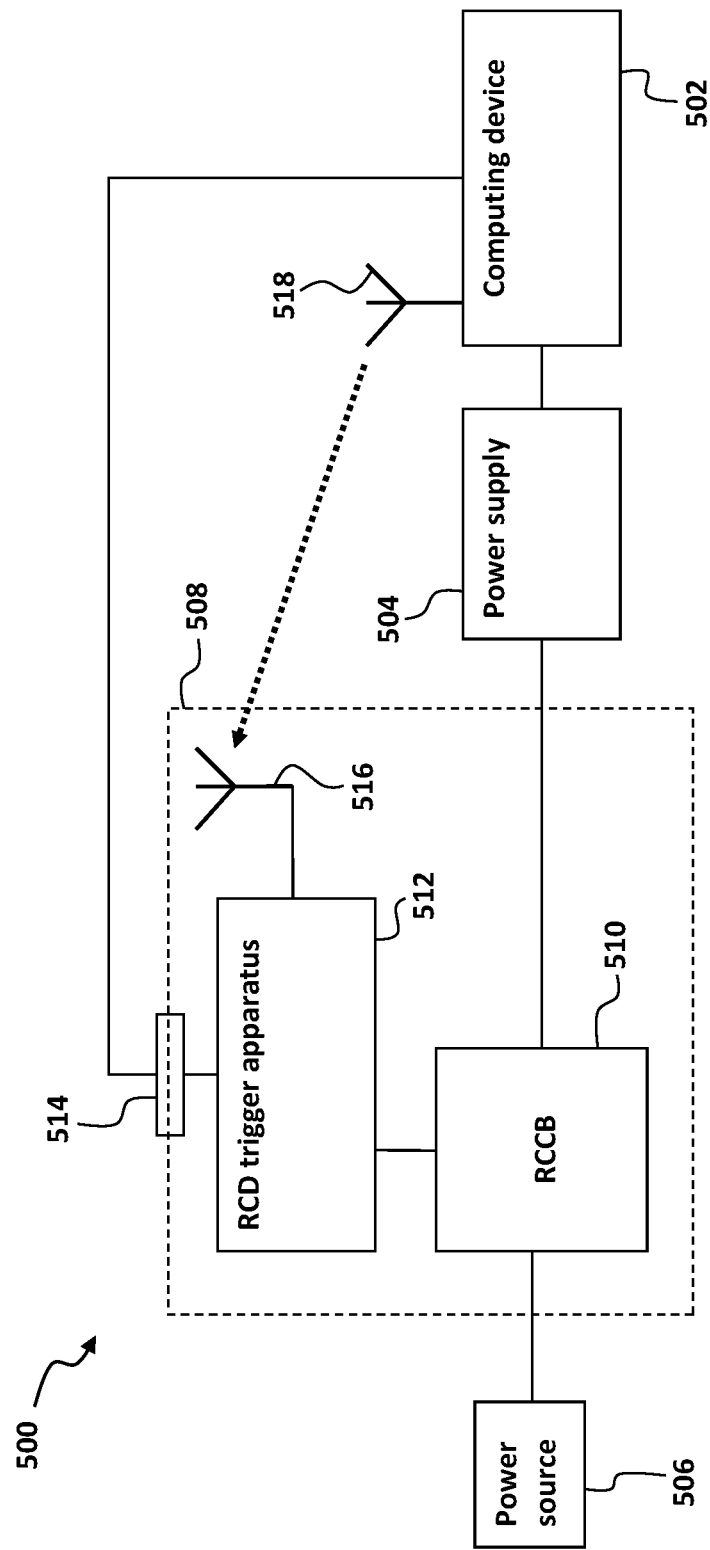
FIG. 5A is a is a schematic diagram of an exemplary system for protection of a computing device in the event of an intrusion attempt being detected.

FIG. 5A illustrates another implementation of the principles of the present disclosure, in a computing device intrusion protection system 500. A computing device 502, for example a personal computer or a server, has a power supply 504. The power supply 506 is connected to a power source 508 (for example a mains power supply) via a power disconnect apparatus 508. The power disconnect apparatus 508 includes an RCD in the form of RCCB 510 between the power source 506 and power supply 504. The power disconnect apparatus 508 includes an RCD trigger apparatus 512 generally configured in the manner previously described with reference to FIG. 2 and FIG. 3, but having a different source of the trigger signal.

The computing device 502 operates an automated intrusion detection software tool, configured to determine an intrusion event, or at least an intrusion attempt meeting a predetermined threat level, on the computing device 502. On determination of such an event, a signal is transmitted to the RCD trigger apparatus 512 via a wired port 514, or a wireless receiver 516 in communication with a wireless transmitter 518 of the computing device 502. It should be appreciated that while the system 500 is illustrated as the computing device 502 itself performing the intrusion detection and subsequent transmission of the trigger signal, this may be performed by a remote device monitoring the computing device 502. Receipt of the trigger causes the RCD trigger apparatus 512 to generate a simulated earth leakage current as previously described, for tripping of the RCCB 510 to disconnect the power supply 504 from the power source 506.

Figure 5B:
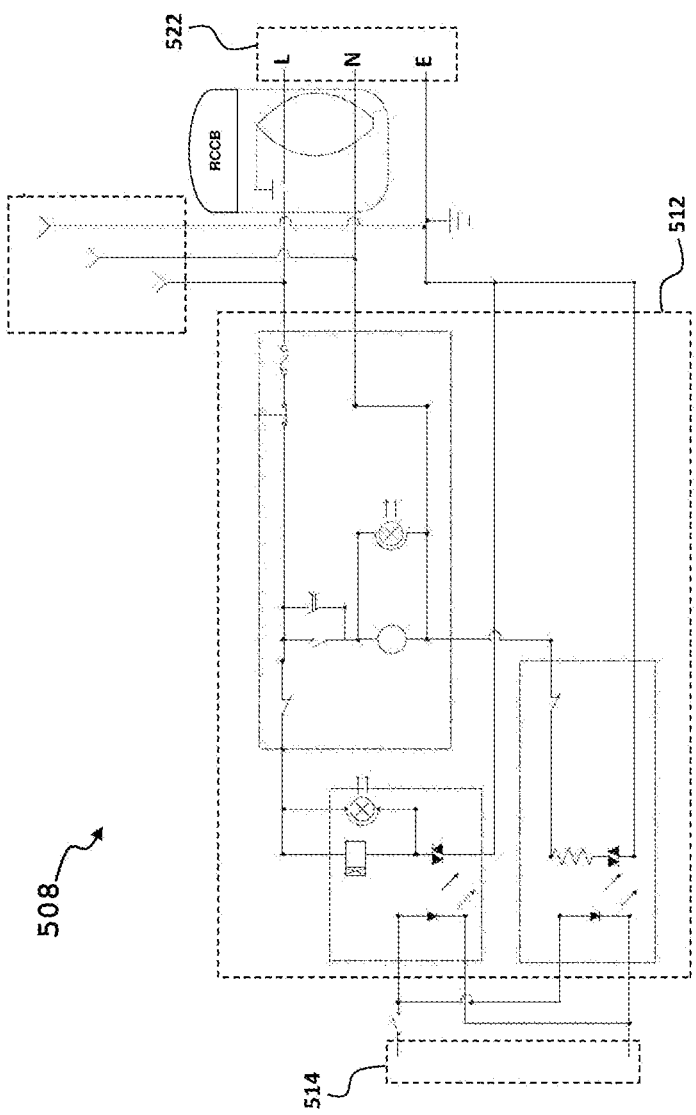
FIG. 5B is a circuit diagram of the exemplary system for protection of the computing device.

FIG. 5B illustrates an exemplary embodiment of the power disconnect apparatus 508. The RCD trigger apparatus 512 has substantially the same configuration as the RCD trigger circuit 210, the voltage limiting circuit 212, and the fault protection circuit 214 as described above with reference to FIG. 3. In this exemplary embodiment the trigger signal is received via the wired port 514. The power disconnect apparatus 508 is configured as a discrete device, including a female socket for connection to the power supply 504, and a male plug 522 for insertion into a socket of power source 506. However, it should be appreciated that it is also envisaged that in exemplary embodiments the power disconnect apparatus 508 may be integrated with the power supply 504.

No admission is made that any reference disclosed herein constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the field of endeavour, in New Zealand or in any other country.

Throughout this specification, the word "comprise" or "include", or variations thereof such as "comprises", "includes", "comprising" or "including" will be understood to imply the inclusion of a stated element, integer or step, or group of elements integers or steps, but not the exclusion of any other element, integer or step, or group of elements, integers or steps.

Embodiments described herein may also be said broadly to consist in the parts, elements and features referred to or indicated in the specification of the application, individually or collectively, in any or all combinations of two or more of said parts, elements or features.

Where in the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the scope of the disclosure and without diminishing its attendant advantages. It is therefore intended that such changes and modifications be included within the present invention.

The invention claimed is:

1. A system, comprising:
a residual current device (RCD),
an activation circuit configured to generate a signal indicative of an alarm condition; and
an RCD trigger circuit coupled to the activation circuit and the RCD, configured to provide a simulated earth leakage current condition to trigger the RCD on receiving the signal indicative of the alarm condition; and
a voltage limiting circuit configured to limit the voltage on one or more sub-circuits connected to the RCD to a pre-determined voltage level, wherein the pre-determined voltage level is determined to be safe for human contact on triggering of the RCD trigger circuit.

2. The system of claim 1, wherein the RCD is a Residual Current Circuit Breaker.

3. The system of claim 1, wherein the RCD trigger circuit comprises a first switching device configured to provide a connection for the simulated earth leakage current between live and earth.

4. The system of claim 3, wherein the first switching device is a solid state relay.

5. The system of claim 1, wherein the activation circuit comprises a manually actuated switching device, activation of which causes generation of the signal indicative of an alarm condition.

6. The system of claim 1, wherein the activation circuit comprises a communication device configured to receive a signal sent remotely from the user, receipt of which causes generation of the signal indicative of an alarm condition.

7. The system of claim 1, comprising a computing device configured to:
operate an automated intrusion detection software tool; and
transmit a signal to the activation circuit on detection of an intrusion event,
wherein the activation circuit is configured to generate the signal indicative of an alarm condition on receipt of the signal from the computing device.

8. The system of claim 1, wherein the activation circuit comprises a fire detector circuit configured to be responsive to indicators of one or more of: combustion, heat, smoke, flame, and gas, and generate the signal indicative of the alarm condition.

9. The system of claim 8, wherein the fire detector circuit comprises an alarm device, with activation of the alarm device providing the signal indicative of the alarm condition.

10. The system of claim 9, wherein the alarm device is a piezoelectric buzzer.

11. The system of claim 1, wherein the RCD trigger circuit is configured to provide a simulated earth leakage current of 15 mA to 150 mA.

12. The system of claim 11, wherein the simulated earth leakage current is 30 mA to 100 mA.

13. The system of claim 1, wherein the RCD trigger circuit comprises a first resistance between live and earth, and the voltage limiting circuit comprises a second resistance between neutral and earth, providing a voltage divider network to provide the desired safe voltage while the RCD trigger circuit is activated.

14. The system of claim 13, wherein the voltage limiting circuit comprises a second switching device triggered by the signal indicative of an alarm condition to selectively switch the second resistance into the voltage divider.

15. The system of claim 1, comprising a fault protection circuit, the fault protection circuit comprising a timer configured to disconnect the RCD trigger circuit in the event of the RCD not tripping within a predetermined time.

16. The system of claim 15, wherein the timer is configured to disconnect the RCD trigger circuit in the event of an earth conductor fault.

17. The system of claim 16, wherein the fault protection circuit comprises a third switch device controlled by the timer to disconnect the RCD trigger circuit.

18. A device, comprising:
   an activation circuit configured to generate a signal indicative of an alarm condition;
   an RCD trigger circuit coupled to the activation circuit and a residual current device (RCD), configured to provide a simulated earth leakage current condition to trigger the RCD on receiving the signal indicative of the alarm condition; and
   a voltage limiting circuit configured to limit the voltage on one or more sub-circuits connected to the RCD to a pre-determined voltage level, wherein the pre-determined voltage level is determined to be safe for human contact on triggering of the RCD trigger circuit.

19. An apparatus, comprising:
   an RCD trigger circuit configured to be coupled to an activation circuit configured to generate a signal indicative of an alarm condition, and a residual current device (RCD),
   wherein the RCD trigger circuit is configured to provide a simulated earth leakage current condition to trigger the RCD on receiving the signal indicative of the alarm condition; and
   a voltage limiting circuit configured to limit the voltage on one or more sub-circuits connected to the RCD to a pre-determined voltage level, wherein the pre-determined voltage level is determined to be safe for human contact on triggering of the RCD trigger circuit.

* * * * *